United States Patent
Saito et al.

(10) Patent No.: US 11,870,076 B2
(45) Date of Patent: Jan. 9, 2024

(54) BINDER FOR NONAQUEOUS ELECTROLYTE SECONDARY BATTERY ELECTRODE

(71) Applicants: TOAGOSEI CO., LTD., Tokyo (JP); PANASONIC ENERGY CO., LTD., Moriguchi (JP)

(72) Inventors: Naohiko Saito, Nagoya (JP); Takashi Hasegawa, Nagoya (JP); Atsushi Nishiwaki, Nagoya (JP); Hideo Matsuzaki, Nagoya (JP); Nobuhiro Sakitani, Osaka (JP); Sho Urata, Hyogo (JP); Takaharu Morikawa, Osaka (JP)

(73) Assignees: TOAGOSEI CO., LTD., Tokyo (JP); PANASONIC ENERGY CO., LTD., Osaka (JP)

( * ) Notice: Subject to any disclaimer, the term of this patent is extended or adjusted under 35 U.S.C. 154(b) by 700 days.

(21) Appl. No.: 16/499,593

(22) PCT Filed: Mar. 5, 2018

(86) PCT No.: PCT/JP2018/008258
§ 371 (c)(1),
(2) Date: Sep. 30, 2019

(87) PCT Pub. No.: WO2018/180231
PCT Pub. Date: Oct. 4, 2018

(65) Prior Publication Data
US 2020/0044254 A1 Feb. 6, 2020

(30) Foreign Application Priority Data
Mar. 28, 2017 (JP) .................. 2017-063809

(51) Int. Cl.
*H01M 4/62* (2006.01)
*H01M 10/0525* (2010.01)
*C08F 220/14* (2006.01)
*C08F 290/12* (2006.01)
*C08F 220/18* (2006.01)
*C08F 8/14* (2006.01)

(52) U.S. Cl.
CPC .............. *H01M 4/622* (2013.01); *C08F 8/14* (2013.01); *C08F 220/14* (2013.01); *C08F 220/1804* (2020.02); *C08F 290/126* (2013.01); *H01M 10/0525* (2013.01); *Y02E 60/10* (2013.01)

(58) Field of Classification Search
CPC .................................................... H01M 4/622
See application file for complete search history.

(56) References Cited

U.S. PATENT DOCUMENTS

| 2002/0034686 A1* | 3/2002 | Yamakawa | H01M 4/621 429/231.95 |
|---|---|---|---|
| 2013/0316234 A1 | 11/2013 | Momose et al. | |
| 2015/0010815 A1 | 1/2015 | Chung et al. | |
| 2016/0204465 A1 | 7/2016 | Mimura et al. | |
| 2017/0062828 A1* | 3/2017 | Sonobe | C08L 33/02 |
| 2017/0346075 A1 | 11/2017 | Mimura et al. | |
| 2017/0352886 A1 | 12/2017 | Matsuzaki et al. | |

FOREIGN PATENT DOCUMENTS

| CN | 103429628 A | 12/2013 |
| CN | 105580187 A | 5/2016 |
| CN | 108140839 A | 6/2018 |
| JP | 2000-294247 A | 10/2000 |
| JP | 2005-063846 A | 3/2005 |
| JP | 2007-128871 A | 5/2007 |
| JP | 2015-018776 A | 1/2015 |
| JP | 2015-088486 A | 5/2015 |
| WO | 2012/093689 A1 | 7/2012 |
| WO | 2016/076371 A1 | 5/2016 |
| WO | 2016/132872 A1 | 8/2016 |
| WO | 2016/158939 A1 | 10/2016 |

OTHER PUBLICATIONS

Apr. 24, 2018 Written Opinion issued in International Patent Application No. PCT/2018/008258.
Apr. 24, 2018 International Search Report issued in International Patent Application No. PCT/JP2018/008258.
Mar. 24, 2022 Office Action issued in Chinese Patent Application No. 201880022483.1.
Jul. 27, 2023 Office Action issued in Chinese Patent Application No. 201880022483.1.
Jan. 28, 2023 Office Action issued in Chinese Patent Application No. 201880022483.1.

* cited by examiner

*Primary Examiner* — Ula C Ruddock
*Assistant Examiner* — Mary Grace Byram
(74) *Attorney, Agent, or Firm* — Oliff PLC

(57) ABSTRACT

A water-based binder for a non-aqueous electrolyte secondary battery. A binder for a non-aqueous electrolyte secondary battery electrode, includes a crosslinked polymer having a carboxyl group or a salt thereof, and the crosslinked polymer includes a structural unit derived from an ethylenically unsaturated carboxylic acid monomer; and a structural unit derived from a macromonomer including at least one compositional monomer selected from compounds represented by following formula (1):

[C1]

$$H_2C=CR^1-X \qquad \text{formula (1)}$$

wherein in formula (1), $R^1$ represents a hydrogen or a methyl group; X represents $C(=O)OR^2$ or CN; and $R^2$ represents a straight chain or branched C1-C8 alkyl group or a C3-C8 alkyl group having an alicyclic structure.

10 Claims, No Drawings

BINDER FOR NONAQUEOUS ELECTROLYTE SECONDARY BATTERY ELECTRODE

FIELD

The present disclosure relates to a binder for a non-aqueous electrolyte secondary battery electrode that can be used for lithium-ion secondary batteries and the like and use thereof, and a method for producing a crosslinked polymer or a salt thereof used for the binder.

CROSS REFERENCE TO RELATED APPLICATIONS

This application is a related application of Japanese Patent Applications 2017-063809 and 2017-063810 filed on Mar. 28, 2017, all contents of which are incorporated herein by reference. This application also claims priority based on Japanese Patent Application No. 2017-063809.

BACKGROUND ART

Lithium-ion secondary batteries are one of the well-known non-aqueous electrolyte secondary batteries. Non-aqueous electrolyte secondary battery electrodes are prepared by, for example, applying compositions for electrode mixture layer formations containing active materials, binders and the like on current collectors and drying the same. Binders used for negative electrode mixture layer compositions are water-based binders containing styrene-butadiene rubber (SBR) latex and carboxymethylcellulose (CMC). Binders containing acrylic acid polymer aqueous solution or aqueous dispersion are known binders having excellent dispersibility and binding ability. Meanwhile, a solution of polyvinylidene fluoride (PVDF) in N-methyl-2-pyrrolidone (NMP) has been widely used as a binder for positive electrode mixture layers. However, there are increasing needs for water-based positive electrode mixture layer compositions without using organic solvents based on recent increased environmental consciousness.

Meanwhile, as applications of lithium-ion secondary batteries expand, demands for improved reliability and durability thereof tend to increase. Therefore, for the purpose of improving durability by preventing peeling or detachment of electrode mixture layers, an improvement in binding ability of binders has been studied (Patent Literatures 1 to 3).

For example, Patent Literature 1 discloses a binding agent for formation of a negative electrode coating film of a lithium-ion secondary battery, which is an acrylic acid polymer crosslinked by a polyalkenyl ether. Patent Literature 2 discloses a water-based electrode binder for a secondary battery, comprising a water-soluble polymer that has a specific aqueous solution viscosity and comprises a structural unit derived from an ethylenically unsaturated carboxylic acid salt monomer and a structural unit derived from an ethylenically unsaturated carboxylic acid ester monomer. Patent Literature 3 discloses a water dispersion having a specific viscosity and comprising a salt of a crosslinked polymer that contains a structural unit derived from an ethylenically unsaturated carboxylic acid salt monomer.

CITATION LIST

Patent Literature

[Patent Literature 1] Japanese Patent Application Publication No. 2000-294247
[Patent Literature 2] Japanese Patent Application Publication No. 2015-18776
[Patent Literature 3] WO 2016/158939

Patent Literature 1 discloses use of a crosslinked polyacrylic acid as a binding agent. However, an improvement in flexing endurance of the electrode obtained was still required. The binder disclosed in Patent Literature 2 had preferable flexibility, while the binding ability thereof was not satisfactory. There is also a room for further improvement in binding ability of the binder disclosed in document 3.

With the foregoing in view, the present disclosure provides a water-based binder for a non-aqueous electrolyte secondary battery having excellent binding ability.

SUMMARY

Solution to Problem

The inventors of the present invention carried out an exhaustive study in order to solve the problem. As a result, the inventors found that a water-based binder for a non-aqueous electrolyte secondary battery containing an acrylic acid crosslinked polymer having a hydrophobic moiety has strong binding to an active material or the like used in an electrode, and thus an electrode mixture layer containing the binder shows excellent binding ability and adhesion. According to the present disclosure, the following means are provided on the basis of the finding.

The disclosure herein provides a binder for a non-aqueous electrolyte secondary battery electrode, containing a crosslinked polymer having a carboxyl group or a salt thereof. The binder may contain a crosslinked polymer or a salt thereof, the crosslinked polymer including a structural unit derived from an ethylenically unsaturated carboxylic acid monomer and a structural unit derived from a macromonomer including at least one compositional monomer selected from compounds represented by following formula (1):

[C1]

$$H_2C=CR^1-X \qquad \text{formula (1)}$$

wherein in formula (1), $R^1$ represents a hydrogen or a methyl group; X represents $C(=O)OR^2$ or CN; and $R^2$ represents a straight chain or branched C1-C8 alkyl group or a C3-C8 alkyl group having an alicyclic structure.

DESCRIPTION OF EMBODIMENTS

The present disclosure relates to methods for producing the binder for a non-aqueous electrolyte secondary battery electrode of the present disclosure and a crosslinked polymer used for the binder, as well as a composition for a non-aqueous electrolyte secondary battery electrode mixture layer, a non-aqueous electrolyte secondary battery electrode and a non-aqueous electrolyte secondary battery obtained with the binder.

According to the binder for a non-aqueous electrolyte secondary battery electrode of the present disclosure, components in the structural unit of the macromonomer exhibit interaction with an electrode active material or conductivity auxiliary agent derived from a carbon material or a silicon material, and thus excellent binding ability of such electrode material is provided. The binder may also exhibit preferable binding ability with a current collector. Therefore, with the binder, an electrode mixture layer having excellent integrity may be formed that bonds well with an electrode material and binds well to a current collector. Therefore, deterioration of an electrode mixture layer due to change in the volume and shape of an active material associated with charge and discharge may be prevented and a secondary battery having high durability (cycle property) can be obtained.

The composition for a non-aqueous electrolyte secondary battery electrode mixture layer disclosed herein has preferable binding ability to an electrode material and preferable bonding ability to a current collector, and thus may form an electrode mixture layer with preferable integrity, and thus may provide a non-aqueous electrolyte secondary battery electrode with preferable electrode properties.

The binder for a non-aqueous electrolyte secondary battery electrode disclosed herein contains a crosslinked polymer or a salt thereof, and may be mixed with an active material and water to form an electrode mixture layer composition. The composition may be in the form of slurry that may be applied on a current collector, or may be prepared in the form of wet powder that may be used for pressing onto the surface of a current collector. By forming a mixture layer formed from the composition on the surface of a current collector such as a copper foil or an aluminum foil, the non-aqueous electrolyte secondary battery electrode of the present disclosure may be obtained.

The binder disclosed herein may be, for example, in the mode indicated below without particular limitation. Namely, the crosslinked polymer may contain 50% by mass or more and 99.9% by mass or less of the ethylenically unsaturated carboxylic acid monomer relative to all structural units in the crosslinked polymer. The crosslinked polymer may contain 0.1% by mass or more and 50% by mass or less of the macromonomer relative to all structural units of the crosslinked polymer. The crosslinked polymer may further include a structural unit derived from a crosslinkable monomer. The salt of the crosslinked polymer may include a lithium salt. The crosslinked polymer or a salt thereof may have a pH of 8.0 or more in a 0.5% by mass aqueous solution.

The following provides a detailed explanation of representative, non-limiting specific examples of the present disclosure with suitable reference to the drawings. This detailed explanation is merely intended to indicate details for carrying out preferable examples of the present disclosure to a person with ordinary skill in the art, and is not intended to limit the scope of the present disclosure. In addition, additional characteristics and inventions disclosed below can be used separately or in combination with other characteristics and inventions in order to further improve binder for nonaqueous electrolyte secondary battery electrode.

In addition, combinations of the characteristics and steps disclosed in the following detailed explanation are not essential for carrying out the present disclosure in the broad sense, and are only described to explain representative detailed examples of the present disclosure in particular. Moreover, the various characteristics of the above-mentioned and forthcoming representative specific examples along with the various characteristics disclosed in independent and dependent claims are not required to be combined as described in the specific examples described herein or in the order in which they are listed in the providing of additional and useful embodiments of the present disclosure.

All characteristics described in the present description and/or claims are intended to be disclosed separately and mutually independently from the constitution of the characteristics described in the examples and/or claims while limiting to the disclosure and claimed specified matters at the time of initial filing. Moreover, all descriptions relating to numerical ranges and groups or populations are intended to disclose intermediate constitutions thereof while limiting to the disclosure and claimed specified matters at the time of initial filing.

The binder for a non-aqueous electrolyte secondary battery disclosed herein and various modes in which the binder is used are described hereinafter.

The "(meth)acryl" as used herein means acryl and/or methacryl, and the "(meth)acrylate" means acrylate and/or methacrylate. The "(meth)acryloyl group" means an acryloyl group and/or methacryloyl group.

<Binder>

The binder disclosed herein contains a crosslinked polymer having a carboxyl group or a salt thereof. The crosslinked polymer having a carboxyl group or a salt thereof includes a structural unit derived from an ethylenically unsaturated carboxylic acid and a structural unit derived from a macromonomer.

<Structural Units in the Crosslinked Polymer>
<Structural Unit Derived from an Ethylenically Unsaturated Carboxylic Acid Monomer>

The crosslinked polymer may include a structural unit (hereinafter also merely referred to as "component (a)") derived from an ethylenically unsaturated carboxylic acid monomer. As the crosslinked polymer includes such a structural unit, the bonding ability to a current collector increases and excellent desolvation effect and ion conductivity of lithium ions may be obtained when the crosslinked polymer has a carboxyl group, resulting in an electrode having low resistance and excellent high-rate performance. Because water swelling ability is also imparted, the dispersion stability of an active material or the like in a mixture layer composition may also be increased.

The component (a) may be introduced in the crosslinked polymer by, for example, polymerizing monomers containing an ethylenically unsaturated carboxylic acid monomer. Alternatively, the component (a) may be obtained by (co)polymerizing a (meth)acrylic acid ester monomer followed by hydrolysis. Alternatively, (meth)acrylamide, (meth)acrylonitrile and the like may be polymerized followed by treatment with a strong alkali or a method in which a polymer having a hydroxy group is reacted with an acid anhydride may also be used.

Examples of the ethylenically unsaturated carboxylic acid monomer include (meth)acrylic acid; (meth)acrylamidoalkylcarboxylic acids such as (meth)acrylamidohexanoic acid and (meth)acrylamidododecanoic acid; ethylenically unsaturated monomers having carboxyl groups such as succinic acid monohydroxyethyl (meth)acrylate, ω-carboxycaprolactone mono(meth)acrylate and β-carboxyethyl (meth)acrylate and (partially) alkali-neutralized products thereof. These monomers may be used alone or two or more thereof may be used in combination. Among others, the compound having an acryloyl group is preferable because of high polymerization rate and thus provision of a polymer having a long primary chain, resulting in preferable binding strength of the binder, and acrylic acid is particularly preferable. When the ethylenically unsaturated carboxylic acid monomer used is acrylic acid, a polymer having high carboxyl group content may be obtained.

The content of the component (a) (excluding a structural unit derived from an ethylenically unsaturated carboxylic acid monomer that may be included in the component (b) described hereinbelow) in the crosslinked polymer is not particularly limited and may be, for example, 50% by mass or more and 99.9% by mass or less relative to all structural units in the crosslinked polymer. Because the content of the component (a) is within the above range, excellent bonding ability to a current collector may be easily secured. The lower limit is, for example, 60% by mass or more, or for example 70% by mass or more, or for example 80% by mass or more. The upper limit is, for example, 99.5% by mass or less, or for example 99.0% by mass or less, or for example 95.0% by mass or less. The range may be any of those obtained by appropriately combining the lower limits and the upper limits, and may be, for example, 60% by mass or more and 99.5% by mass or less, or for example 70% by mass or more and 99.5% by mass or less, or for example 80% by mass or more and 99.5% by mass or less. When the proportion of the component (a) relative to all structural units is less than 50% by mass, dispersion stability, binding ability and durability of a battery may be insufficient.

<Structural Unit Derived from a Macromonomer>

The crosslinked polymer includes a structural unit (hereinafter also merely referred to as "component (b)") derived from a macromonomer containing at least one compositional monomer selected from compounds represented by formula (1) indicated below. The component (b) may exhibit strong interaction with an electrode material and may exhibit preferable binding ability to an active material. As a result, an electrode mixture layer which is rigid and has preferable integrity may be obtained. In addition, by providing the component (b) as a macromonomer, the binding ability to an electrode material may be further improved. Hereinafter, monomers in the macromonomer which provides the component (b) are described, followed by descriptions on modes and production of the macromonomer.

[C2]

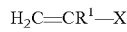

$$H_2C=CR^1—X \qquad \text{formula (1)}$$

In formula (1), R' represents a hydrogen or a methyl group; and X may represent $C(=O)OR^2$ or CN. When X represents $C(=O)OR^2$, the compound represented by formula (1) is a (meth)acrylic acid ester and when X represents CN, the compound represented by formula (1) is (meth)acrylonitrile.

In formula (1), $R^2$ may represent a straight chain or branched C1-C8 alkyl group or a C3-C8 alkyl group having an alicyclic structure. Examples of the straight chain or branched alkyl group include a methyl group, an ethyl group, a propyl group, an isopropyl group, an n-butyl group, an isobutyl group, a tert-butyl group, an n-pentyl group, an n-hexyl group, an n-heptyl group, an n-octyl group and a 2-ethylhexyl group.

Examples of the C3-C8 alkyl group having an alicyclic structure include cycloalkyl groups such as a cyclopropyl group, a cyclobutyl group, a cyclopentyl group, a cyclohexyl group, a cycloheptyl group and a cyclooctyl group; cycloalkenyl groups such as a cyclopropenyl group, a cyclobutenyl group, a cyclopentenyl group, a cyclohexenyl group, a cycloheptenyl group and a cyclooctenyl group; alkyl-substituted cycloalkyl groups such as a methylcyclohexyl group and an ethylcyclohexyl group; and cycloalkyl-substituted alkyl groups such as a cyclopropylmethyl group, a cyclopropylethyl group and a cyclohexylethyl group.

The component (b) may include, in addition to the structural unit derived from the compound represented by formula (1), a structural unit derived from another monomer capable of copolymerizing with the compound represented by formula (1). The monomer is not particularly limited and may be, for example, an ethylenically unsaturated carboxylic acid monomer. The monomer is as described hereinabove and may be, for example, methacrylic acid.

The proportion of the structural unit derived from the ethylenically unsaturated carboxylic acid monomer in the component (b) is not particularly limited, and may be, for example, 0% by mass or more and 50% by mass or less relative to all structural units in the macromonomer. Because the amount of the structural unit derived from the monomer is within the above range, a crosslinked polymer having a suitable crosslinking structure may be formed together with the monomer that provides the component (a). The lower limit is, for example, 5% by mass or more, or for example 10% by mass or more, or for example 15% by mass or more. The upper limit is, for example, 40% by mass or less, or for example 25% by mass or less. The range may be, for example, 5% by mass or more and 40% by mass or less.

The component (b) may further contain a structural unit derived from a chain transfer agent (molecular weight regulator). When a well-known chain transfer agent is used for regulating the molecular weight of the macromonomer, such a unit may be included. Examples of the chain transfer agent include alkyl mercaptans such as butyl mercaptan and dodecyl mercaptan; alkyl sulfides; alkyl disulfides; thioglycolic acid esters such as 2-ethylhexyl thioglycolate and octyl thioglycolate; α-methyl styrene dimer; mercapto acids such as β-mercaptopropionic acid; and aromatic mercaptans such as benzyl mercaptan, thiophenol, thiocresol and thionaphtol. Without particular limitation, such a structural unit may be, for example, 1% by mass or more and 20% by mass or less, or for example 2% by mass or more and 15% by mass or less, or for example 5% by mass or more and 10% by mass or less relative to all structural units in the macromonomer.

The proportion of the structural unit derived from the compound represented by formula (1) in the component (b) is not particularly limited, and may be, for example, 50% by mass or more relative to all structural units in the macromonomer. Because the amount of the structural unit derived from the compound represented by formula (1) is 50% by mass or more, the interaction with an active material can be securely improved because of the structural unit derived from the compound in the macromonomer. The proportion may be, for example, 60% by mass or more, or for example 65% by mass or more, or for example 70% by mass or more.

<Macromonomer>

The macromonomer which provides the component (b) is hereinafter described. The macromonomer which provides the component (b) may have an ethylenically unsaturated group in the intermediate segment of and/or at an end of the molecular chain. Namely, the ethylenically unsaturated group contained in the macromonomer may be bound (present) only at an end of the molecular chain (polymer chain) or may be bound (present) only in the intermediate segment of the molecular chain (polymer chain) that forms the macromonomer or both. Because the macromonomer has an ethylenically unsaturated group in, for example, the intermediate segment of the molecular chain, interaction with an electrode material may be facilitated on the surface of fine particles of the crosslinked polymer obtained, thereby further improving binding ability with the electrode material.

The ethylenically unsaturated group included in the macromonomer may be directly bound in the intermediate segment of the molecular chain of the macromonomer or may be suspended in the intermediate segment of the molecular chain of the macromonomer via a certain linking group. These two binding formats may exist simultaneously.

Examples of a group having an ethylenically unsaturated group include a (meth)acryloyl group, an allyl group, an isopropenyl group and a styryl group, and one or more than one groups may exist. The group having an ethylenically unsaturated group as a radically polymerizable functional group is preferably a (meth)acryloyl group.

The carboxyl group included in the macromonomer may be present in the intermediate segment of the molecular chain or may be present at an end of the molecular chain or both. When the macromonomer contains the carboxyl group in the intermediate segment of the molecular chain, the carboxyl group may be directly bound in the intermediate segment of the molecular chain or may be suspended from the molecular chain via a certain linking group. These two binding formats may exist simultaneously.

The carboxyl group included in the macromonomer is preferably neutralized with a base. Because the carboxyl group is neutralized, an effect for preventing aggregation may be obtained when producing the crosslinked polymer by, for example, precipitation polymerization, resulting in stable production of a slurry of the crosslinked polymer. A neutralizing agent of the carboxyl group used is, preferably, an ammonia and/or an amine compound having a low boiling point as described hereinbelow.

Because of improved binding ability to an electrode material, the macromonomer is preferably a linear polymer having a linear molecular structure. When the macromonomer is a linear polymer, the linear structure thereof may be any of a straight chain, a branched chain, a star shape, a comb shape and the like, among which a straight chain or an approximately straight chain is preferable because of improved binding ability to an active material, facilitated production and facilitated handling.

The macromonomer has a number average molecular weight (Mn) of, for example, 1,000 to 20,000, or for example 2,000 to 10,000 because of an effect of stabilization of dispersion and facilitated handling and facilitated production.

The macromonomer is preferably, without particular limitation, a macromonomer obtained by addition reaction of a compound having an epoxy group and an ethylenically unsaturated group to some carboxyl groups in, for example, a polymer having carboxyl groups in the intermediate segment of and/or at an end of the molecular chain. Such a macromonomer has high flexibility in the structural design and has excellent crosslinking polymerizability.

Such a macromonomer may be obtained by reacting a polymer (A), as a precursor, having a carboxyl group in the intermediate segment of and/or at an end of the molecular chain and a compound (α) having an epoxy group and an ethylenically unsaturated group.

The polymer (A) may be obtained by polymerizing monomers that may form the component (b) described hereinabove. Namely, the monomers are the compound represented by formula (1), the ethylenically unsaturated carboxylic acid monomer and the chain transfer agent for molecular weight regulation that may be optionally used.

When the chain transfer agent used has a carboxyl group, the polymer (A) may have a carboxyl group derived from the chain transfer agent introduced at an end of the polymer (A).

Examples of the ethylenically unsaturated carboxylic acid monomer used for production of the polymer (A) include unsaturated carboxylic acids such as acrylic acid, methacrylic acid, crotonic acid, itaconic acid and maleic acid; dimers or higher oligomers which are Michael addition reaction products of unsaturated carboxylic acids such as acrylic acid and methacrylic acid; carboxyl group-containing (meth)acrylates such as co-carboxy polycaprolactone mono(meth)acrylate, monohydroxyethyl (meth)acrylate phthalate and monohydroxyethyl (meth)acrylate succinate. The compounds may be used alone or two or more thereof may be used in combination.

The polymer (A) preferably has a number average molecular weight (Mn) within the suitable range in the macromonomer described hereinabove.

The polymer (A) is preferably obtained by emulsion polymerization. Emulsion polymerization has high polymerization rate and allows narrow composition distribution of the polymer. Emulsion polymerization for obtaining the polymer (A) may be carried out with the monomers described above in water or an aqueous medium according to the similar method as conventional emulsion polymerization under similar polymerization conditions. Upon emulsion polymerization, a polymerization initiator (polymerization catalyst) such as an organic peroxide, an azo compound or a persulfate compound described hereinbelow may be appropriately used. If necessary, an emulsifying agent may also be used. Because of the stabilizing effect due to polymerization initiator fragments resulting in stable emulsion polymerization without using an emulsifying agent, the initiator used is more preferably a persulfate compound such as ammonium persulfate and potassium persulfate.

As described hereinabove, the macromonomer may be obtained by reaction of the polymer (A) with the compound (α) having an epoxy group and an ethylenically unsaturated group.

Examples of the group containing an ethylenically unsaturated group included in the compound (α) include a (meth)acryloyl group, an allyl group, an isopropenyl group and a styryl group. Among these, the compound (α) preferably contains a (meth)acryloyl group because the macromonomer obtained has high reactivity and an effect of stabilization of dispersion. Preferable specific examples of the compound (α) include glycidyl (meth)acrylate, 3,4-epoxycyclohexyl methyl(meth)acrylate and 4-hydroxybutyl (meth)acrylate glycidyl ether. The compounds may be used alone or two or more thereof may be used in combination.

When the polymer (A) is allowed to react with the compound (α) having an epoxy group and an ethylenically unsaturated group, the epoxy group in the compound (α) is added to some carboxyl groups present in the intermediate segment of and/or at an end of the molecular chain of the polymer (A) to provide a macromonomer having the ethylenically unsaturated group introduced in the intermediate segment of and/or at an end of the molecular chain of the polymer (A). Namely, a macromonomer produced has the ethylenically unsaturated group together with the carboxyl group in the intermediate segment of and/or at an end of the molecular chain. In the reaction system, the macromonomer and unreacted polymer (A) may be present.

When the polymer (A) is produced by emulsion polymerization, addition reaction of the compound (α) to the polymer (A) may be carried out with a fine particle dispersion of the polymer (A). It is preferable that after the polymer (A) is produced, the compound (α) is added to the dispersion of the polymer (A) while maintaining the dispersed state (suspension state) thereof.

Upon addition reaction of the compound (α) to the polymer (A), the amount of addition of the compound (α) is, for example, 0.5 to 2.2 moles (namely, 0.5 to 2.2 equivalents), or for example 0.8 to 2.0 moles (0.8 to 2.0 equivalents) relative to 1 mole of the polymer (A). Because the amount of addition of the compound (α) is within the above range which is preferable, aggregation of deposited particles may be easily prevented when the crosslinked polymer of the present invention is produced by precipitation polymerization. The number of moles of the polymer (A) may be determined by dividing the mass of the polymer (A) actually used by the number average molecular weight (Mn) of the polymer (A). Namely, the number of moles added of the compound (α) relative to 1 mole of the polymer (A) means the average incorporation rate (f value) of ethylenically unsaturated groups per molecule (per polymer chain) of the macromonomer.

In the polymer composition (mixture containing the polymer) containing the macromonomer obtained, the average content of ethylenically unsaturated groups per polymer molecule in whole polymer containing the macromonomer is 0.5 to 2.5, or for example 0.8 to 2.2, or for example 1.0 to 2.0. Because the average content of ethylenically unsaturated groups per polymer molecule is within the above range which is preferable, aggregation of deposited particles may be easily prevented when the crosslinked polymer of the present disclosure is produced by precipitation polymerization.

Upon addition reaction of the compound (α) to the polymer (A), a catalyst such as a tertiary amine compound, a quaternary ammonium salt compound or a phosphine compound may be used in order to increase the addition reaction rate. Particularly, a tertiary amine compound such as triethylamine serves as a neutralizing agent of a carboxyl group in the polymer (A), and thus is preferably used. Particularly, the catalyst is more preferably used when the addition reaction is carried out in a water medium because side reaction of addition reaction of the compound (α) to water is reduced.

Residual carboxyl groups in the macromonomer obtained by addition reaction of the compound (α) to some carboxyl groups in the polymer (A) are stabilized by neutralizing the same with a base as described above. The reaction conditions are not particularly limited, and the addition reaction of the compound (α) to the polymer (A) may be carried out by adding the compound (α) to a solution or dispersion of the polymer (A) and heating the same generally to 50° C. to 120° C.

<Other Structural Units>

The crosslinked polymer may contain, in addition to the component (a) and the component (b), a structural unit (hereinafter also simply referred to as "component (c)") derived from an additional ethylenically unsaturated monomer capable of copolymerizing with the ethylenically unsaturated carboxylic acid monomer. Examples of the component (c) include a structural unit derived from an ethylenically unsaturated monomer compound having an anionic group other than carboxyl group such as a sulfonate group and a phosphate group or a nonionic ethylenically unsaturated monomer. The structural unit may be introduced by copolymerizing monomers containing an ethylenically unsaturated monomer compound having an anionic group other than carboxyl group such as a sulfonate group and a phosphate group or a nonionic ethylenically unsaturated monomer. Among others, the component (c) is preferably a structural unit derived from a nonionic ethylenically unsaturated monomer because of flexing endurance.

When the component (c) is a structural unit derived from a nonionic ethylenically unsaturated monomer, the proportion thereof is not particularly limited and the sum thereof with all structural units derived from the component (b) may be 0.1% by mass or more and 50% by mass or less relative to all structural units in the crosslinked polymer. This is because the component (c) together with the component (b) may improve binding ability to the active material. The component (c) may be 1% by mass or more relative to all structural units in the crosslinked polymer. In this case, a mixture layer having higher flexibility may be obtained, resulting in an electrode having excellent flexing endurance. Because affinity for an electrolyte solution improves, an effect for improving lithium ion conductivity may also be expected. The component (c) is 5% by mass or more and 40% by mass or less, or for example 10% by mass or more and 30% by mass or less relative to all structural units in the crosslinked polymer. The component (c) may be copolymerized with the component (a).

The nonionic ethylenically unsaturated monomer is preferably (meth)acrylamide or a derivative thereof because of excellent binding ability of the binder. Examples of the (meth)acrylamide derivative include N-alkyl(meth)acrylamide compounds such as isopropyl(meth)acrylamide, t-butyl (meth)acrylamide, N-n-butoxymethyl(meth)acrylamide and N-isobutoxymethyl(meth)acrylamide; and N,N-dialkyl (meth)acrylamide compounds such as dimethyl(meth)acrylamide and diethyl(meth)acrylamide. The compounds may be used alone or two or more thereof may be used in combination.

Alternatively, the nonionic ethylenically unsaturated monomer used may be, for example, a (meth)acrylic acid ester. Examples of the (meth)acrylic acid ester include (meth)acrylic acid alkyl ester compounds such as methyl (meth)acrylate, ethyl (meth)acrylate, butyl (meth)acrylate, isobutyl (meth)acrylate and 2-ethylhexyl (meth)acrylate;

(meth)acrylic acid cycloalkyl ester compounds such as cyclohexyl (meth)acrylate and methylcyclohexyl (meth) acrylate;

(meth)acrylic acid aralkyl ester compounds such as phenyl (meth)acrylate, phenylmethyl (meth)acrylate and phenylethyl (meth)acrylate;

(meth)acrylic acid alkoxyalkyl ester compounds such as 2-methoxyethyl (meth)acrylate and ethoxyethyl (meth)acrylate; and (meth)acrylic acid hydroxyalkyl ester compounds such as hydroxyethyl (meth)acrylate, hydroxypropyl (meth)acrylate and hydroxybutyl (meth)acrylate. The compounds may be used alone or two or more thereof may be used in combination. (Meth)acrylic acid aralkyl ester compounds are preferably used because of adhesiveness with an active material and cycle property.

When the nonionic ethylenically unsaturated monomer for the component (c) used is a (meth)acrylic acid ester, the proportion of the structural unit derived from the (meth) acrylic acid ester may be, for example, 1% by mass or more and 30% by mass or less, or for example 5% by mass or more and 30% by mass or less, or for example 10% by mass or more and 30% by mass or less relative to all structural units in the crosslinked polymer. In this case, the proportion of the component (a) is, for example, 70% by mass or more and 99% by mass or less, or for example 70% by mass or more and 95% by mass or less, or for example 70% by mass or more and 90% by mass or less relative to all structural units in the crosslinked polymer.

Because lithium ion conductivity and high-rate performance are more improved, a compound having an ether bond such as alkoxyalkyl (meth)acrylates including 2-methoxyethyl (meth)acrylate and ethoxyethyl (meth)acrylate is preferable and 2-methoxyethyl (meth)acrylate is more preferable.

Among the nonionic ethylenically unsaturated monomers, a compound having an acryloyl group is preferable because of high polymerization rate, resulting in a polymer having long primary chain length and a binder having preferable binding strength. The nonionic ethylenically unsaturated monomer is preferably a compound having a glass transition temperature (Tg) of a homopolymer of 0° C. or lower because the electrode obtained has preferable flexing endurance.

The crosslinked polymer may be a salt. The type of the salt is not particularly limited and examples thereof include salts of alkali metals such as lithium, sodium and potassium; alkaline earth metal salts such as a calcium salt and a barium salt; other metal salts such as a magnesium salt and an aluminum salt; ammonium salts and organic amine salts. Among others, alkali metal salts and a magnesium salt is preferable and alkali metal salts are more preferable because adverse effects on battery properties may hardly occur. Particularly preferable alkali metal salts are a lithium salt and a sodium salt. A lithium salt is suitable because of properties at low temperatures.

<Modes of the Crosslinked Polymer>

The modes of crosslinking in the crosslinked polymer are not particularly limited, and examples thereof include modes according to the methods indicated below.
1) Copolymerization of crosslinkable monomers;
2) Utilizing chain transfer to polymer chains during radical polymerization; and
3) Synthesizing a polymer having a reactive functional group followed by optional addition of a crosslinking agent and post crosslinking.

Among others, the method by copolymerization of crosslinkable monomers is preferable because the procedures are easy and the degree of crosslinking may be easily regulated.

<Crosslinkable Monomer>

Examples of the crosslinkable monomer include a polyfunctional polymerizable monomer having two or more polymerizable unsaturated groups and a monomer having an crosslinkable functional group that is autocrosslinkable such as a hydrolyzable silyl group.

The polyfunctional polymerizable monomer is a compound having two or more polymerizable functional groups such as a (meth)acryloyl group and an alkenyl group in a molecule, and examples thereof include polyfunctional (meth)acrylate compounds, polyfunctional alkenyl compounds and compounds having both (meth)acryloyl group and alkenyl group. The compounds may be used alone or two or more thereof may be used in combination. Among others, a polyfunctional alkenyl compound is preferable and a polyfunctional allyl ether compound having more than one allyl ether group in a molecule is particularly preferable because homogeneous crosslinking structure may be easily obtained.

Examples of the polyfunctional (meth)acrylate compound include di(meth)acrylates of dihydric alcohols such as ethylene glycol di(meth)acrylate, propylene glycol di(meth)acrylate, 1,6-hexanediol di(meth)acrylate, polyethylene glycol di(meth)acrylate and polypropylene glycol di(meth)acrylate; poly(meth)acrylates such as tri(meth)acrylates and tetra(meth)acrylates of tri- or higher poly-hydric alcohols such as trimethylolpropane tri(meth)acrylate, tri(meth)acrylate of ethylene oxide-modified trimethylolpropane, glyceryl tri(meth)acrylate, pentaerythritol tri(meth)acrylate and pentaerythritol tetra(meth)acrylate; bisamides such as methylenebisacrylamide and hydroxyethylenebisacrylamide.

Examples of the polyfunctional alkenyl compound include polyfunctional allyl ether compounds such as trimethylolpropane diallyl ether, trimethylolpropane triallyl ether, pentaerythritol diallyl ether, pentaerythritol triallyl ether, tetraallyloxyethane and polyallyl saccharose; polyfunctional allyl compounds such as diallyl phthalate; and polyfunctional vinyl compounds such as divinylbenzene.

Examples of the compound having both (meth)acryloyl group and alkenyl group include allyl (meth)acrylate, isopropenyl (meth)acrylate, butenyl (meth)acrylate, pentenyl (meth)acrylate and 2-(2-vinyloxyethoxy)ethyl (meth)acrylate.

Specific examples of the monomer having a crosslinkable functional group that is autocrosslinkable include hydrolyzable silyl group-containing vinyl monomers, N-methylol (meth)acrylamide and N-methoxyalkyl(meth)acrylates. The compounds may be used alone or two or more thereof may be used in combination.

The hydrolyzable silyl group-containing vinyl monomer is not particularly limited as long as the monomer is a vinyl monomer having at least one hydrolyzable silyl group. Examples thereof include vinylsilanes such as vinyltrimethoxysilane, vinyltriethoxysilane, vinylmethyldimethoxysilane and vinyldimethylmethoxysilane; silyl group-containing acrylic acid esters such as trimethoxysilylpropyl acrylate, triethoxysilylpropyl acrylate and methyldimethoxysilylpropyl acrylate; silyl group-containing methacrylic acid esters such as trimethoxysilylpropyl methacrylate, triethoxysilylpropyl methacrylate, methyldimethoxysilylpropyl methacrylate and dimethylmethoxysilylpropyl methacrylate; silyl group-containing vinyl ethers such as trimethoxysilylpropyl vinyl ether; and silyl group-containing vinyl esters such as vinyl trimethoxysilylundecanoate.

When the crosslinked polymer is crosslinked by the crosslinkable monomer, the amount of the crosslinkable monomer used is preferably 0.02% to 0.7% by mole and more preferably 0.03% to 0.4% by mole relative to the total amount of monomers (non-crosslinkable monomers) other than the crosslinkable monomer. The amount of the crosslinkable monomer used of 0.02% by mole or more is preferable because the binding ability and the stability of a mixture layer slurry is more improved. When the amount is 0.7% by mole or less, the stability of the crosslinked polymer tends to increase.

The amount of the crosslinkable monomer used is, for example, 0.05% to 5% by mass, or for example 0.1% to 4% by mass, or for example 0.2% to 3% by mass, or for example 0.3% to 2% by mass in all compositional monomers in the crosslinked polymer.

When a crosslinked polymer has increased polymer chain length (primary chain length), the toughness thereof is generally enhanced, high binding ability may be provided and the viscosity of an aqueous dispersion thereof increases. A crosslinked polymer obtained by carrying out a relatively low extent of crosslinking to a polymer having a long primary chain length or a salt thereof is present in water as a microgel swollen in water. The composition for an electrode mixture layer of the present disclosure shows an effect of increased viscosity and an effect of stabilization of dispersion due to interaction of the microgel. The interaction of the microgel may vary according to the degree of water swelling of the microgel and the strength of the microgel, which are affected by the degree of crosslinking of the crosslinked polymer. When the degree of crosslinking is too low, the microgel may have insufficient strength, resulting in insufficient effect of stabilization of dispersion or binding ability. Meanwhile, when the degree of crosslinking is too high, the microgel may have an insufficient degree of swelling, resulting in insufficient effect of stabilization of dispersion or binding ability. Namely, it is desirable that the crosslinked polymer is a slightly crosslinked polymer obtained by appropriate crosslinking carried out on a polymer having a sufficiently long primary chain length.

The crosslinked polymer or a salt thereof is preferably in the form of salt in which acid groups such as carboxyl groups derived from the ethylenically unsaturated carboxylic acid monomer are neutralized, thereby providing the degree of neutralization in a mixture layer composition of 20% to 100% by mole. The degree of neutralization is more preferably 50% by mole or more and 100% by mole or less and still more preferably 60% by mole or more and 95% by mole or less. The degree of neutralization of 20% by mole or more is preferable because the water swelling is preferable and an effect of stabilization of dispersion may be easily obtained. In the present specification, the degree of neutralization may be calculated from the amounts charged of the monomer having an acid group such as a carboxyl group and a neutralizing agent used for neutralization. The degree of neutralization may be verified from the ratio of the strength between the peak derived from the C=O group of the carboxylic acid and the peak derived from the C=O group of Li carboxylate obtained by subjecting powder of the crosslinked polymer or a salt thereof obtained after drying treatment under reduced pressure at 80° C. for 3 hours to IR analysis.

The crosslinked polymer or a salt thereof preferably has the degree of neutralization described above, and the crosslinked polymer or a salt thereof may have a pH of, for example, 7.5 or more in the 0.5% by mass aqueous solution. If the pH is 7.5 or more, preferable dispersibility, applicability (easiness of coating of the binder), adhesiveness, cycle property and the like may be secured, resulting in preparation of an electrode having excellent integrity. Alternatively, the pH is, for example, 8.0 or more, or for example 8.2 or more, or for example 8.5 or more. The upper limit is not particularly limited and may be, for example, 10.0 or less, or for example 9.0 or less.

The pH of the 0.5% by mass aqueous solution may be adjusted according to the degree of neutralization of the crosslinked polymer, and when the degree of neutralization is high, the pH shifts to the alkaline side.

<Method for Producing the Crosslinked Polymer or a Salt Thereof

The crosslinked polymer may be produced according to well-known polymerization methods such as solution polymerization, precipitation polymerization, suspension polymerization and inverse emulsion polymerization, and precipitation polymerization and suspension polymerization (inverse suspension polymerization) are preferable because of productivity. Precipitation polymerization is more preferable because more preferable properties such as binding ability may be obtained. Precipitation polymerization is a method for producing a polymer by carrying out polymerization reaction in a solvent that dissolves raw material unsaturated monomers, while not substantially dissolving the polymer produced. With the progress of polymerization, polymer particles grow by aggregation, resulting in a dispersion of polymer particles of a few μm to several tens of μm which are secondary aggregated primary polymers of several tens of nm to several hundreds of nm. Secondary aggregation may be prevented by selecting a dispersion stabilizer, a polymerization solvent and the like. Precipitation polymerization in which secondary aggregation is prevented is generally referred to as dispersion polymerization.

In precipitation polymerization, the polymerization solvent used may be selected from water and various organic solvents by taking the type of monomers used into account. In order to obtain a polymer having a longer primary chain length, a solvent having a small chain transfer constant is preferably used.

Specific examples of the polymerization solvent include water-soluble solvents such as methanol, t-butyl alcohol, acetone, acetonitrile and tetrahydrofuran, and benzene, ethyl acetate, dichloroethane, n-hexane, cyclohexane and n-heptane, any one of which may be used alone or two or more thereof may be used in combination. Alternatively, the solvent(s) may be used as a mixed solvent with water. The water-soluble solvent as used herein refers to a solvent having a solubility in water at 20° C. of 10 g/100 ml or more.

Among others, acetonitrile is preferable because generation of coarse particles and adhesion to a reactor is low and polymerization stability is preferable, polymer fine particles deposited are hardly secondarily aggregated (or even if secondary aggregation occurs, aggregates are easily disaggregated in a water medium), a polymer obtained has a small chain transfer constant and a high degree of polymerization (primary chain length) and the procedure of the step neutralization described hereinbelow is easy.

In order to proceed neutralization reaction stably and rapidly in the step neutralization, it is preferable that a small amount of a highly polar solvent is added in the polymerization solvent. Examples of the highly polar solvent preferably include water and methanol. The amount of the highly polar solvent used is, for example, 0.05% to 10.0% by mass, or for example 0.1% to 5.0% by mass, or for example 0.1% to 1.0% by mass based on the total mass of the medium. When the proportion of the highly polar solvent is 0.05% by mass or more, an effect on neutralization reaction is observed and when the proportion is 10.0% by mass or less, an adverse effect on polymerization reaction is not observed. In polymerization of an ethylenically unsaturated carboxylic acid monomer with high hydrophilicity such as acrylic acid, addition of a highly polar solvent improves the polymerization rate and facilitates production of a polymer having a long primary chain length. Among highly polar solvents, water is preferable because water has a high effect of improving the polymerization rate.

The present production method preferably includes a polymerization step of precipitation polymerization of 50% by mass or more and 99.9% by mass or less of the ethylenically unsaturated carboxylic acid monomer from which the component (a) is derived and 0.1% by mass or more and 50% by mass or less of the macromonomer from which the component (b) is derived. According to the polymerization step, the crosslinked polymer contains, for example, 50% by mass or more and 99.9% by mass or less of the structural unit (component (a)) derived from the ethylenically unsaturated carboxylic acid monomer introduced therein and 0.1% by mass or more and 50% by mass or less of the structural unit (component (b)) derived from the macromonomer introduced therein. The amount of the ethylenically unsaturated carboxylic acid monomer used is, for example, 60% by mass or more and 99.9% by mass or less, or for example 70% by mass or more and 99.9% by mass or less. The ethylenically unsaturated carboxylic acid monomer may be non-neutralized or may be in the form of neutralized salt. The ethylenically unsaturated carboxylic acid monomer used may be in the form of partially neutralized salt. Because polymerization rate is high and thus a polymer obtained has high molecular weight and excellent binding ability, the ethylenically unsaturated carboxylic acid monomer has a degree of neutralization of preferably 10% by mole or less, more preferably 5% by mole or less and still more preferably the monomer is non-neutralized.

In the present production method, in addition to the ethylenically unsaturated carboxylic acid monomer and the macromonomer, additional ethylenically unsaturated monomer capable of copolymerizing with the above monomers, namely a monomer component from which the component (c) is derived may be included. Examples of the additional ethylenically unsaturated monomer include ethylenically unsaturated monomer compounds having anionic groups other than carboxyl group such as sulfonate group and phosphate group, and nonionic ethylenically unsaturated monomers. Among others, a structural unit derived from a nonionic ethylenically unsaturated monomer is preferable because of the flexing endurance. The nonionic ethylenically unsaturated monomer may be included at, for example, 1% by mass or more and 50% by mass or less such as 5% by mass or more and 40% by mass or less such as 10% by mass or more and 30% by mass or less relative to the total amount of monomer components of the crosslinked polymer (including monomer components of the macromonomer).

When the crosslinked polymer contains 1% by mass or more component (c), the nonionic ethylenically unsaturated monomer used which provides a mixture layer having a higher flexibility may be the monomers described above as monomers that form the component (c). Among others, (meth)acrylamide and a derivative thereof are preferable because the binding ability of the binder is excellent. The nonionic ethylenically unsaturated monomer used may alternatively be, for example, a (meth)acrylic acid ester. When a (meth)acrylic acid ester is used, the amount of the (meth) acrylic acid ester used is, for example, 1% by mass or more and 30% by mass or less, for example, 5% by mass or more and 30% by mass or less, for example, 10% by mass or more and 30% by mass or less relative to the total amount of monomer components.

The polymerization initiator used may be a well-known polymerization initiator such as an azo compound, an organic peroxide and an inorganic peroxide without particular limitation. The use conditions may be adjusted within well-known methods such as thermal initiation, redox initiation using a reducing agent in combination and UV initiation so as to provide an appropriate amount of radical generation. In order to obtain a crosslinked polymer having long primary chain length, the conditions are preferably adjusted to reduce the amount of radical generation as much as possible within the allowable production time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4, 4-trimethylpentane) and 2,2'-azobis(2-methylpropane), any one of which may be used alone or two or more thereof may be used.

Examples of the organic peroxide include 2,2-bis(4,4-di-t-butylperoxycyclohexyl)propane (manufactured by NOF Corporation; the same applies hereinafter in this paragraph, product name "PERTETRA A"), 1,1-di(t-hexylperoxy)cyclohexane (product name "PERHEXA HC"), 1,1-di(t-butylperoxy)cyclohexane (product name "PERHEXA C"), n-butyl-4,4-di(t-butylperoxy)valerate (product name "PERHEXA V"), 2,2-di(t-butylperoxy)butane (product name "PERHEXA 22"), t-butyl hydroperoxide (product name "PERBUTYL H"), cumene hydroperoxide (manufactured by NOF Corporation, product name "PERCUMYL H"), 1,1,3,3-tetramethylbutyl hydroperoxide (product name "PEROCTA H"), t-butyl cumyl peroxide (product name "PERBUTYL C"), di-t-butyl peroxide (product name "PERBUTYL D"), di-t-hexyl peroxide (product name "PERHEXYL D"), di(3,5,5-trimethylhexanoyl)peroxide (product name "PEROYL 355"), dilauroyl peroxide (product name "PEROYL L"), bis(4-t-butylcyclohexyl)peroxydicarbonate (product name "PEROYL TCP"), di-2-ethylhexylperoxydicarbonate (product name "PEROYL OPP"), di-sec-butylperoxydicarbonate (product name "PEROYL SBP"), cumylperoxyneodecanoate (product name "PERCUMYL ND"), 1,1,3,3-tetramethylbutylperoxyneodecanoate (product name "PEROCTA ND"), t-hexylperoxyneodecanoate (product name "PERHEXYL ND"), t-butylperoxyneodecanoate (product name "PERBUTYL ND"), t-butylperoxyneoheptanoate (product name "PERBUTYL NHP"), t-hexylperoxypivalate (product name "PERHEXYL PV"), t-butylperoxypivalate (product name "PERBUTYL PV"), 2,5-dimethyl-2,5-di(2-ethylhexanoyl)hexane (product name "PERHEXA 250"), 1,1,3,3-tetramethylbutylperoxy-2-ethylhexanoate (product name "PEROCTA 0"), t-hexylperoxy-2-ethylhexanoate (product name "PERHEXYL 0"), t-butylperoxy-2-ethylhexanoate (product name "PERBUTYL 0"), t-butylperoxylaurate (product name "PERBUTYL L"), t-butylperoxy-3,5,5-trimethylhexanoate (product name "PERBUTYL 355"), t-hexylperoxyisopropylmonocarbonate (product name "PERHEXYL I"), t-butylperoxyisopropylmonocarbonate (product name "PERBUTYL I"), t-butylperoxy-2-ethylhexylmonocarbonate (product name "PERBUTYL E"), t-butylperoxyacetate (product name "PERBUTYL A"), t-hexylperoxybenzoate (product name "PERHEXYL Z") and t-butylperoxybenzoate (product name "PERBUTYL Z"), any one of which may be used alone or two or more thereof may be used.

Examples of the inorganic peroxide include potassium persulfate, sodium persulfate and ammonium persulfate. For redox initiation, the reducing agent used may be sodium sulfite, sodium thiosulfate, sodium formaldehyde sulfoxylate, ascorbic acid, sulfurous acid gas ($SO_2$) or ferrous sulfate.

The amount of the polymerization initiator used is preferably, for example, 0.001 to 2 parts by mass, for example, 0.005 to 1 part by mass, for example, 0.01 to 0.1 parts by mass when the sum of the monomer components used and the macromonomer is regarded as 100 parts by mass. When the amount of the polymerization initiator used is 0.001 parts by mass or more, polymerization reaction may be stably carried out, and when the amount is 2 parts by mass or less, a polymer having a long primary chain length may be easily obtained.

The concentration of the monomer components and macromonomer during polymerization is preferably high in order to obtain a polymer having a longer primary chain length. However, an extremely high monomer component concentration may facilitate aggregation of polymer particles and make the regulation of the heat of polymerization difficult, thereby allowing runaway polymerization reaction. Therefore, the monomer concentration at the start of polymerization is generally, for example, in the range of approximately 2% to 30% by mass, for example, in the range of 5% to 30% by mass. The polymerization temperature is, although it may vary according to the type and concentration of the monomer used, for example, 0° C. to 100° C., or for example, 20° C. to 80° C. The polymerization temperature may be constant or may vary during polymerization reaction. The polymerization time may be, for example, 1 minute to 20 hours, or for example, 1 hour to 10 hours.

The crosslinked polymer dispersion obtained through the polymerization step may be subjected to reduced pressure and/or heat treatment in a drying step to eliminate the solvent, thereby providing the desired crosslinked polymer in the form of powder. Before the drying step, it is preferable to include a solid-liquid separation step such as centrifugation or filtration and a washing step using an organic solvent or a mixed solvent of an organic solvent and water following the polymerization step in order to eliminate an unreacted monomer (and a salt thereof). When the washing step is included, secondary aggregates of the crosslinked polymer, if being formed, may be disaggregated easily at the time of use, and because the residual unreacted monomer is eliminated, preferable binding ability and battery properties are exhibited.

In the present production method, when the ethylenically unsaturated carboxylic acid monomer or the like and macromonomer used are non-neutralized or partially neutralized salts thereof, an alkali compound may be added to the polymer dispersion obtained after the polymerization step to neutralize the polymer (hereinafter referred to as "step neutralization") followed by elimination of the solvent in the drying step. Alternatively, the crosslinked polymer powder which is non-neutralized or partially neutralized salt may be obtained followed by addition of an alkali compound at the time of preparing an electrode mixture layer slurry to neutralize the polymer (hereinafter referred to as "post neutralization"). Among others, the step neutralization is preferable because secondary aggregates tend to be disaggregated.

<Composition for a Non-Aqueous Electrolyte Secondary Battery Electrode Mixture Layer>

The composition for a non-aqueous electrolyte secondary battery electrode mixture layer of the present invention contains a binder containing the crosslinked polymer or a salt thereof, an active material and water. The amount of the crosslinked polymer or a salt thereof used in the electrode mixture layer composition of the present invention is, for example, 0.1% by mass or more and 20% by mass or less relative to the total amount of the active material. The amount is, for example, 0.2% by mass or more and 10% by mass or less for example, 0.3% by mass or more and 8% by mass or less for example, 0.4% by mass or more and 5% by mass or less. When the amount of the crosslinked polymer and a salt thereof used is less than 0.1% by mass, sufficient binding ability to an electrode material including a carbon material or a silicon material may not be obtained. The dispersion stability of an active material may also be insufficient and the homogeneity of the mixture layer formed may decrease. Meanwhile, when the amount of the crosslinked polymer and a salt thereof used is above 20% by mass, the electrode mixture layer composition may have high viscosity to decrease applicability thereof on a current collector. As a result, the mixture layer obtained may have spots and unevenness to adversely affect the electrode properties.

When the amount of the crosslinked polymer and a salt thereof used is within the above range, the composition obtained has excellent dispersion stability and the mixture layer obtained may have extremely high adhesiveness to a current collector, resulting in improved durability of the battery. The crosslinked polymer and a salt thereof exhibit sufficiently high binding ability with an active material even at a small amount (such as 5% by mass or less) and also have a carboxy anion, thereby providing an electrode having low interfacial resistance and excellent high-rate performance.

Among the active materials described above, the positive electrode active material mainly used is a lithium salt of a transition metal oxide, and layered rock salt type and spinel type lithium-containing metal oxides, for example, may be used. Specific compounds of the layered rock salt type positive electrode active material include lithium cobalt oxide, lithium nickel oxide and so-called ternary compounds such as NCM $\{Li(Ni_x, Co_y, Mn_z), x+y+z=1\}$ and NCA $\{Li(Ni_{1-a-b}CO_aAl_b)\}$. Examples of the spinel type positive electrode active material include lithium manganese oxide. Other than oxides, phosphate salts, silicate salts and sulfur may be used, and examples of the phosphate salt include olivine type lithium iron phosphate. The positive electrode active materials above may be used alone or two or more thereof may be used in combination as a mixture or a composite.

When the positive electrode active material containing a layered rock salt type lithium-containing metal oxide is dispersed in water, lithium ions on the active material surface and hydrogen ions in water are exchanged, and thus the dispersion is alkaline. Therefore, an aluminum (Al) foil or the like which is a common positive electrode current collector material may be corroded. In such case, it is preferable to neutralize alkaline components eluted from the active material by using, as a binder, the non-neutralized or partially neutralized crosslinked polymer. The amount of the non-neutralized or partially neutralized crosslinked polymer used is preferably such that the amount of non-neutralized carboxyl groups in the crosslinked polymer is equivalent to or above the amount of alkali eluted from the active material.

The positive electrode active material has low electric conductivity, and thus it is common that a conductivity auxiliary agent is added thereto upon use. Examples of the conductivity auxiliary agent include carbon materials such as carbon black, carbon nanotubes, carbon fibers, graphite fine powder and carbon fibers, among which carbon black, carbon nanotubes and carbon fibers are preferable because excellent conductivity may be easily obtained. The carbon black is preferably ketjen black and acetylene black. The conductivity auxiliary agents described above may be used alone or two or more thereof may be used in combination. The amount of the conductivity auxiliary agent may be, for example, 0.2% to 20% by mass, or for example, 0.2% to 10% by mass relative to the total amount of the active material in order to achieve both conductivity and energy density. The positive electrode active material used may be surface-coated with a conductive carbon material.

Meanwhile, examples of the negative electrode active material include carbon materials, metallic lithium, lithium alloys and metal oxides, any one of which may be used alone or two or more thereof may be used in combination. Among others, an active material made of a carbon material (hereinafter also referred to as "carbon active material") such as natural graphite, artificial graphite, hard carbon and soft carbon is preferable and graphite such as natural graphite and artificial graphite and hard carbon are more preferable. In case of graphite, spherical graphite is suitably used because of battery properties, and the particle size thereof is preferably in the range of, for example, 1 to 20 µm, or for example, 5 to 15 µm. In order to increase energy density, the negative electrode active material used may be a metal or oxide of a metal that may occlude lithium such as silicon and tin. Among others, silicon has a higher capacity than graphite and thus an active material made of a silicon material (hereinafter also referred to as "silicon active material") such as silicon, silicon alloys and silicon oxides such as silicon monoxide (SiO) may be used. However, the silicon active material has a large volume change associated with charge and discharge despite high capacity. Therefore, it is preferable to use together with the carbon active material. In this case, when the amount of the silicon active material added is high, the electrode material may collapse and cycle property (durability) may be significantly decreased. Because of this, when the silicon active material is used together, the amount thereof is, for example, 60% by mass or less or for example, 30% by mass relative to the carbon active material.

The carbon active material has preferable conductivity per se, and thus addition of a conductivity auxiliary agent is not always required. When a conductivity auxiliary agent is added for the purpose of further decreasing the resistance or the like, the amount thereof is, for example, 10% by mass or less or for example, 5% by mass or less relative to the total amount of the active material because of energy density.

When the composition for a non-aqueous electrolyte secondary battery electrode mixture layer is slurry, the amount of the active material used is, for example, in the range of 10% to 75% by mass or for example, in the range of 30% to 65% by mass relative to the total amount of the composition. When the amount of the active material used is 10% by mass or more, migration of the binder or the like may be inhibited and the cost for drying the medium may enjoy an advantage. Meanwhile, when the amount is 75% by mass or less, the fluidity and applicability of the composition may be secured and a homogeneous mixture layer may be formed.

When the composition for an electrode mixture layer prepared is wet powder, the amount of the active material used is, for example, in the range of 60% to 97% by mass or for example, in the range of 70% to 90% by mass relative to the total amount of the composition. It is preferable that nonvolatile components other than the active material such as the binder and the conductivity auxiliary agent are as low as possible within the range that can secure required binding ability and conductivity because of energy density.

The composition for a non-aqueous electrolyte secondary battery electrode mixture layer contains water as a medium. For the purpose of adjusting properties and drying property of the composition, the medium may be a mixed solvent with a water-soluble organic solvent such as lower alcohols including methanol and ethanol, carbonates including ethylene carbonate, ketones including acetone, tetrahydrofuran and N-methylpyrrolidone. The proportion of water in the mixed medium is, for example, 50% by mass or more or for example, 70% by mass or more.

When the composition for an electrode mixture layer is slurry that may be applied, the content of the medium including water in the whole composition is, for example, in the range of 25% to 90% by mass or for example, 35% to 70% by mass because of applicability of the slurry, an energy cost required for drying and productivity. When the composition is wet powder that may be pressed, the content of the medium is, for example, in the range of 3 to 40% by mass or for example, in the range of 10% to 30% by mass because of the homogeneity of the mixture layer after pressing.

The binder disclosed herein may contain only the crosslinked polymer or a salt thereof. However, in addition to this, an additional binder component such as styrene/butadiene latex (SBR), acrylic latex and polyvinylidene fluoride latex may be used in combination. When an additional binder component is used in combination, the amount thereof may be, for example, 0.1% to 5% by mass or less, for example, 0.1% to 2% by mass or less or for example, 0.1% to 1% by mass or less relative to the active material. When the amount of the additional binder component used is above 5% by mass, the resistance increases and the high-rate performance may be insufficient. Among others, styrene/butadiene latex is preferable because of excellent balance between binding ability and flexing endurance.

The styrene/butadiene latex refers to a water-based dispersion of a copolymer having a structural unit derived from an aromatic vinyl monomer such as styrene and a structural unit derived from an aliphatic conjugated diene monomer such as 1,3-butadiene. Examples of the aromatic vinyl monomer include, in addition to styrene, α-methylstyrene, vinyltoluene and divinylbenzene, one or two or more of which may be used. The structural unit derived from the aromatic vinyl monomer in the copolymer may be, for example, in the range of 20% to 60% by mass or for example, in the range of 30% to 50% by mass mainly because of binding ability.

Examples of the aliphatic conjugated diene monomer include, in addition to 1,3-butadiene, 2-methyl-1,3-butadiene, 2,3-dimethyl-1,3-butadiene and 2-chloro-1,3-butadiene, one or two or more of which may be used. The structural unit derived from the aliphatic conjugated diene monomer in the copolymer may be, for example, in the range of 30% to 70% by mass, or for example, in the range of 40% to 60% by mass because it allows the binder to have preferable binding ability and the electrode obtained to have preferable flexibility.

The styrene/butadiene latex may contain, in addition to the above monomers, an additional monomer which is a copolymerization monomer such as a nitrile group-containing monomer such as (meth)acrylonitrile and a carboxyl group-containing monomer such as (meth)acrylic acid, itanconic acid and maleic acid in order to further improving properties such as binding ability.

The structural unit derived from the additional monomer in the copolymer may be, for example, in the range of 0% to 30% by mass, or for example, in the range of 0% to 20% by mass.

The composition for a non-aqueous electrolyte secondary battery electrode mixture layer of the present invention contains the active material, water and the binder as requisite components and may be obtained by mixing the components using a well-known means. The method for mixing the components is not particularly limited and may be a well-known method. A preferable method includes dry-blending powder components such as the active material, the conductivity auxiliary agent and crosslinked polymer particles corresponding to the binder followed by mixing with a dispersion medium such as water and mixing and kneading for dispersion. When the composition for an electrode mixture layer obtained is slurry, it is preferable that the finished slurry does not have dispersion defects or aggregates. The means for mixing may be a well-known mixer such as a planetary mixer, a thin-film spin mixer and a planetary centrifugal mixer. Because the preferable dispersive state may be obtained in a short time, a thin-film spin mixer is preferably used. When the thin-film spin mixer is used, preliminary dispersion may be preferably carried out with a stirrer such as a disper. The viscosity of the slurry may be, for example, in the range of 500 to 100,000 mPa·s, or for example, in the range of 1,000 to 50,000 mPa·s as the B type viscosity at 60 rpm.

Meanwhile, when the composition for an electrode mixture layer obtained is wet powder, it is preferable to mix/knead using a Henschel mixer, a blender, a planetary mixer or a biaxial kneader up to homogeneous powder without concentration unevenness.

<Electrode for a Non-Aqueous Electrolyte Secondary Battery>

The electrode for a non-aqueous electrolyte secondary battery of the present invention contains a mixture layer formed from the composition for an electrode mixture layer on the surface of a current collector of copper, aluminum or the like. The mixture layer is formed by applying the composition for an electrode mixture layer of the present invention on the surface of the current collector followed by elimination of a medium such as water by drying. A method for applying the mixture layer composition is not particularly limited, and a well-known method such as the doctor blade method, dipping, roll coating, comma coating, curtain coating, gravure coating and extrusion may be used. Drying may be carried out according to a well-known method such as hot air blowing, reduced pressure, (far) infrared radiation and microwave radiation.

The mixture layer obtained after drying is generally subjected to compression treatment by mold pressing, roll pressing or the like. By compression, the active material and the binder may be tightly adhered and the strength of the mixture layer and the adhesiveness to the current collector may be increased. By compression, the thickness of the mixture layer may be adjusted to, for example, approximately 30% to 80% of the thickness before compression, and the thickness of the mixture layer after compression is generally approximately 4 to 200 μm.

By including a separator and a non-aqueous electrolyte solution with the electrode for a non-aqueous electrolyte secondary battery of the present invention, a non-aqueous electrolyte secondary battery may be prepared.

The separator is provided between the positive electrode and the negative electrode of the battery and plays a role in preventing short circuit due to contact of both electrodes and securing ion conductivity by holding the electrolyte solution. The separator is preferably a film-shaped insulating microporous film having preferable ion permeability and mechanical strength. Specific materials that may be used include polyolefins such as polyethylene and polypropylene, polytetrafluoroethylene and the like.

The non-aqueous electrolyte solution may be a well-known electrolyte solution generally used for non-aqueous electrolyte secondary batteries. Specific solvents include cyclic carbonates with high dielectric constants and high ability to dissolve electrolytes such as propylene carbonate and ethylene carbonate and linear carbonates with low viscosity such as ethyl methyl carbonate, dimethyl carbonate and diethyl carbonate, which may be used alone or as a mixed solvent. The non-aqueous electrolyte solution used contains a lithium salt such as $LiPF_6$, $LiSbF_6$, $LiBF_4$, $LiClO_4$ and $LiAlO_4$ dissolved in the solvent. The non-aqueous electrolyte secondary battery may be obtained by placing a positive electrode plate and a negative electrode plate partitioned by a separator which are spirally wound or stacked in a case or the like.

As described above, the binder for a non-aqueous electrolyte secondary battery electrode disclosed herein shows excellent binding ability to an electrode material in a mixture layer and excellent bonding ability to a current collector, and thus the non-aqueous electrolyte secondary battery containing an electrode obtained with the binder secures preferable integrity and is expected to show preferable durability (cycle property) after repetitive charge and discharge, and thus is suitable for a secondary battery for automobiles.

EMBODIMENTS

The present invention is specifically described hereinafter on the basis of Embodiments. The present invention is not limited by these Embodiments. "Parts" and "%" hereinafter mean parts by mass and % by mass, respectively, unless otherwise stated.

(Production of Macromonomers)

Synthetic Example 1: Production of Macromonomer MM-1

To a glass reactor equipped with a stirrer, a reflux condenser, a thermometer, a nitrogen inlet tube and a liquid feeding pipe connector, 200 parts of ion-exchange water was charged. Further, 0.95 parts of methyl methacrylate (hereinafter also referred to as "MMA"), 2.685 parts of isobutyl methacrylate (hereinafter also referred to as "IBMA"), 1.0 part of methacrylic acid (hereinafter also referred to as "MAA") and 0.365 parts of 2-ethylhexyl thioglycolate (hereinafter also referred to as "OTG") were charged (monomer total: 5 parts), and the inner temperature of the reactor was adjusted to 80° C. while stirring and injection of nitrogen gas.

Meanwhile, to a glass container equipped with a liquid feeding pipe by means of a metering pump, 18.05 parts of MMA, 51.015 parts of IBMA, 19.0 parts of MAA and 6.935 parts of OTG were charged and stirred to prepare a mixed solution of monomers (monomer total: 95 parts). After confirming that the inner temperature of the reactor was stabilized at 80° C., a polymerization initiator aqueous solution containing 0.8 parts of ammonium persulfate (polymerization initiator) dissolved in 3.0 parts of ion-exchange water was added to the reactor. After 5 minutes, feeding of the mixed solution of monomers to the reactor was started by using the metering pump and 95 parts of the mixed solution of monomers was fed to the reactor over 240 minutes at a constant rate. After completion of feeding, the inner temperature of the reactor was raised to 90° C. over 30 minutes, and the inner temperature was maintained thereafter for 4.5 hours to obtain a dispersion of a polymer (A) having a carboxyl group in the intermediate segment of the molecular chain (hereinafter referred to as polymer (A-1)).

Next, after the temperature of the dispersion of the polymer (A-1) in the reactor was decreased to 80° C. over 30 minutes, injection of nitrogen gas was replaced by injection of air and 0.03 parts of methoxyhydroquinone was immediately added. At 5 minutes after addition of methoxyhydroquinone, 9.4 parts of triethylamine (hereinafter also referred to as "TEA") was fed to the reactor over 30 minutes at a constant rate. At 15 minutes thereafter, 10.15 parts of glycidyl methacrylate (hereinafter also referred to as "GMA") was fed to the reactor over 30 minutes at a constant rate and heated at an inner temperature of 80° C. for 3 hours to add GMA to some carboxyl groups in the polymer (A-1), thereby producing a dispersion of a polymer composition containing a macromonomer having a methacryloyl group (a mixture containing the polymer). The polymer composition is hereinafter referred to as "polymer composition (MM-1)".

Thereafter, a sample was collected from the dispersion (MM-1) containing the macromonomer obtained as above and subjected to GC analysis according to the above method. As a result of the measurement, GMA was not detected. The polymer composition (MM-1) had a weight average molecular weight (Mw) measured by GPC of 4,000. The dispersion (MM-1) was heated to 60° C. and dried under reduced pressure (10 kPa or less) for 12 hours to remove volatile components, thereby obtaining a dried powder of the macromonomer MM-1.

Synthetic Examples 2 and 3: Production of Macromonomers MM-2 and -3

By the same procedures as in Synthetic Example 1 using the monomers of the composition indicated in Table 1 below, dispersions of polymers (A-2) and (A-3) having carboxyl groups in the intermediate segment of the molecular chains were produced. The dispersions of the polymers (A-2) and (A-3) obtained as above were subjected to the same procedure as in Synthetic Example 1 to add GMA to some carboxyl groups in the polymers (A-2) and (A-3), thereby producing dispersions of polymer compositions (polymer compositions (MM-2) and (MM-3)) containing the macromonomers.

Thereafter, samples were collected from the dispersions containing the polymer compositions (MM-2) and (MM-3) obtained as above and subjected to GC analysis according to the above method. As a result of the measurements, GMA was not detected in the dispersions. The polymer compositions (MM-2) and (MM-3) both had a weight average molecular weight (Mw) measured by GPC of 4,000. The dispersions were subjected to the drying treatment under reduced pressure as in Synthetic Example 1 to remove volatile components, thereby obtaining dried powders of the macromonomers MM-2 and MM-3.

TABLE 1

|  |  | MM-1 | MM-2 | MM-3 |
|---|---|---|---|---|
| Charged | MMA | 19.0 | 36.35 | 72.7 |
| starting | IBMA | 53.7 | 36.35 |  |
| materials | MAA | 20.0 | 20.0 | 20.0 |
| (parts) | OTG | 7.3 | 7.3 | 7.3 |
| Total |  | 100.0 | 100.0 | 100.0 |

(Production of Crosslinked Polymer Salts)

Production Example 1: Production of Crosslinked Polymer Salt P-1

For polymerization, a reactor equipped with stirring blades, a thermometer, a reflux condenser and a nitrogen inlet tube was used. To the reactor, 875.6 parts of acetonitrile, 4.40 parts of ion-exchange water, 2.0 parts of the macromonomer MM-1, 98.0 parts of acrylic acid (hereinafter referred to as "AA") and 0.5 parts of pentaerythritol triallyl ether (manufactured by Daiso Co., Ltd., product name "Neoallyl P-30") were charged. After thoroughly replacing the content of the reactor by nitrogen, the inner temperature was raised to 55° C. by heating. After confirming that the inner temperature was stabilized at 55° C., 0.0625 parts of V-65 was added as the polymerization initiator and white turbidity was observed in the reaction solution. Thus, this point was regarded as the polymerization initiation point. The polymerization reaction was continued while maintaining the inner temperature at 55° C. by adjusting the outer temperature (temperature of the water bath). At 6 hours after the polymerization initiation point, cooling of the reaction solution was started, and when the inner temperature was decreased to 25° C., 51.5 parts of lithium hydroxide monohydrate (hereinafter referred to as "LiOH·H$_2$O") powder was added. After the addition, stirring was continued at room temperature for 12 hours, and a polymerization reaction solution in the form of slurry containing particles of crosslinked polymer salt P-1 (Li salt, degree of neutralization: 90% by mole) dispersed in a medium was obtained.

The polymer particles were precipitated by centrifugation of the polymer reaction solution obtained, and the supernatant was removed. Thereafter, the precipitate was dispersed again in the same mass of acetonitrile as the polymer reaction solution and then the procedure of precipitation of the polymer particles by centrifugation and removal of the supernatant was repeated twice. The precipitate was recovered, subjected to drying treatment under reduced pressure at 80° C. for 3 hours to remove volatile components to obtain powder of the crosslinked polymer salt P-1. As the crosslinked polymer salt P-1 was hygroscopic, the crosslinked polymer salt P-1 was stored in a sealed water vapor barrier container. When powder of the crosslinked polymer salt P-1 was subjected to IR measurement and the degree of neutralization was determined from the ratio of the strength between the peak derived from the C=O group of the carboxylic acid and the peak derived from C=O of Li carboxylate, which was 90% by mole equal to the value calculated from the charged amounts.

Production Examples 2 to 13: Production of Crosslinked Polymer Salts P-2 to P-13

The same procedure as in Production Example 1 was carried out except that the charged amounts of starting materials, the neutralized salt type and the degree of neutralization were changed as indicated in Table 2, thereby obtaining crosslinked polymer salts P-2 to P-13 in the form of powder. The crosslinked polymer salts were stored in sealed water vapor barrier containers. In Production Example 6, a 48% NaOH aqueous solution was used instead of LiOH·H$_2$O to obtain the crosslinked polymer Na salt (degree of neutralization: 90% by mole). For P-3 to P-5, the pH thereof was measured for 0.5% by mass aqueous solutions prepared.

TABLE 2

| Crosslinked polymer salts | Macromonomers | | Monomers | | | | | Neutralized salts | | Remarks |
| | Type | Parts | AA | PEA | MMA | IBMA | P-30 | Type | Degree of neutralization | |
|---|---|---|---|---|---|---|---|---|---|---|
| P-1 | MM-1 | 2 | 98 |  |  |  | 0.5 | Li | 90% |  |
| P-2 | MM-2 | 1 | 99 |  |  |  | 0.5 | Li | 90% |  |

TABLE 2-continued

| Crosslinked polymer salts | Macromonomers Type | Parts | AA | PEA | MMA | IBMA | P-30 | Neutralized salts Type | Degree of neutralization | Remarks |
|---|---|---|---|---|---|---|---|---|---|---|
| P-3 | | 2 | 98 | | | | 0.5 | Li | 90% | pH = 8.5 |
| P-4 | | 2 | 98 | | | | 0.5 | Li | 85% | pH = 8.2 |
| P-5 | | 2 | 98 | | | | 0.5 | Li | 80% | pH = 7.9 |
| P-6 | | 2 | 98 | | | | 0.5 | Na | 90% | |
| P-7 | | 2 | 83 | 15 | | | 0.5 | Li | 90% | |
| P-8 | | 4 | 96 | | | | 0.5 | Li | 90% | |
| P-9 | MM-3 | 2 | 98 | | | | 0.5 | Li | 90% | |
| P-10 | MM-4 | 2 | 98 | | | | 0.5 | Li | 90% | |
| P-11 | MM-5 | 2 | 98 | | | | 0.5 | Li | 90% | |
| P-12 | — | — | 100 | | | | 0.5 | Li | 90% | |
| P-13 | — | — | 98 | | 1 | 1 | 0.5 | Li | 90% | |

MM-4
Manufactured by Toagosei Co., Ltd., powder macromonomer "AA-6"
Backbone: polymethyl methacrylate
Reactive group: one-terminal methacryloyl group
Molecular weight (Mw): 6,000
MM-5
Manufactured by Toagosei Co., Ltd., powder macromonomer "AN-6"
Backbone: acrylonitrile/styrene copolymer
Reactive group: one-terminal methacryloyl group
Molecular weight (Mw): 6,000
PEA: phenylethyl acrylate
MMA: methyl methacrylate
IBMA: isobutyl methacrylate
P-30: pentaerythritol triallyl ether (manufactured by Daiso Co., Ltd., product name "Neoallyl P-30")

First Embodiment

An electrode was prepared with the crosslinked polymer salt P-1 and evaluated. Specific procedures and evaluation methods are indicated hereinbelow.

(Preparation of a Negative Electrode Plate and Evaluation of Applicability)

SiOx (0.8<x<1.2) of which surface was coated with 10% carbon by CVD was prepared and mixed with graphite at a mass ratio of 5:95 to obtain an active material. The binder used was a mixture of the crosslinked polymer salt P-1, styrene/butadiene latex (SBR) and carboxymethylcellulose (CMC). The active material, P-1, SBR and CMC were mixed at a mass ratio of active material:P-1:SBR:CMC=95.5:1.5:1.5:1.5 (solid contents) with using water as a dilution solvent on T.K. HIVIS MIX manufactured by Primix Corporation to prepare a negative electrode mixture slurry having a solid content of 50%. The negative electrode mixture slurry was applied to each side of a copper foil and dried to form mixture layers. Thereafter, the mixture layers were pressed so that the mixture layer per side had a thickness of 80 μm and a packed density of 1.60 g/cm³.

After drying, the mixture layer before pressing was visually observed for the appearance thereof and applicability was evaluated on the basis of the following criteria, which resulted in judgement of "O".
<Criteria for Applicability>
A: no appearance defects such as stripe unevenness and spots was observed on the surface.
B: a few appearance defects such as stripe unevenness and spots were observed on the surface.
C: appearance defects such as stripe unevenness and spots were significantly observed on the surface.

(Evaluation of Adhesiveness)

On an acrylic plate of 120 mm×30 mm, a mixture layer surface of the negative electrode plate of the size of 100 mm×25 mm was attached through a double-sided adhesive tape (manufactured by Nichiban Co., Ltd., Nicetack NW-20). On a desk top tester manufactured by Nidec-Shimpo Corporation (FGS-TV and FGP-5), 90° peeling was carried out at a measurement temperature of 25° C. and a peeling speed of 50 mm/min and the peeling strength between the mixture layer and the copper foil was measured, thereby evaluating adhesiveness.

(Evaluation of Battery Properties)

Next, a battery containing the negative electrode plate made from the crosslinked polymer salt P-1 was prepared and evaluated. Specific procedures and evaluation methods are indicated hereinbelow.

(Preparation of a positive electrode plate)

In an N-methylpyrrolidone (NMP) solvent, a positive electrode active material which was $LiNi_{0.8}Co_{0.15}Al_{0.05}O_2$, a carbon conductive agent which was acetylene black and polyvinylidene fluoride (PVDF) having an average molecular weight of 1.1 million were mixed at a mass ratio of 95:2.5:2.5 on a mixer to prepare a positive electrode mixture slurry having a solid content of 50%. The prepared slurry was applied on each side of an aluminum foil, dried and pressed so that the mixture layer per side had a thickness of 95 μm and a packed density of 3.60 g/cm³.

(Preparation of Electrolyte Solution)

To a mixed solvent of ethylene carbonate (EC) and dimethyl carbonate (DMC) (volume ratio: EC:DMC=1:3), 5 parts by mass of vinylene carbonate (VC) was added and 1 mole/liter of $LiPF_6$ was dissolved therein to prepare a non-aqueous electrolyte.

(Preparation of a Battery)

The structure of the battery was as follows: the positive and negative electrodes to each of which a lead terminal was attached were spirally wound while placing a separator (made of polyethylene: film thickness 16 μm, pore rate: 47%) therebetween and pressed to squash the same into a flat shape to obtain an electrode body. The electrode body was placed in a battery outer packaging made of an aluminum laminate, a liquid was poured and sealed to obtain a test battery. The test battery has a designed capacity of 800 mAh.

The capacity of the battery was designed on the basis of the charging termination voltage up to 4.2 V.

(Evaluation of Cycle Property)

The battery obtained as above was subjected to 100 repetitive cycles of the following charge/discharge tests at 25° C. and the capacity maintenance rate was evaluated.

(1) Charge Test

The battery was charged at a constant current of 0.3 C (240 mA) up to 4.2 V, and charged at a constant voltage of 4.2 V up to the current of 1/20 C (40 mA).

(2) Discharge Test

The battery was discharged at a constant current of 0.5 C (400 mA) up to 2.75 V.

(3) Idling

The interval between the charge test and the discharge test was 10 minutes.

(Measurement of Alternating-Current Impedance (Initial Resistance))

A lead terminal was attached to each of a negative electrode plate of the size of 25 mm×57 mm and a lithium foil of the size of 50 mm×120 mm. An electrode body obtained by spirally winding the above while placing a separator therebetween was placed in a battery outer packaging made of an aluminum laminate, a liquid was poured and sealed to obtain a test single electrode battery. The test single electrode battery has a designed capacity of 80 mAh. The capacity of the battery was designed on the basis of the charging termination voltage up to 0.01 V vs Li.

(1) Charge Condition

The single electrode battery was charged at a constant current of 0.01 C (0.8 mA) up to 0.05 V vs Li under the condition of 25° C.

(2) Conditions for Measuring Alternating-Current Impedance

Under an environment of 0° C., an alternating-current impedance of the battery was measured with an amplitude of 10 mV by changing the frequency from 0.01 Hz to 100000 Hz, and the reaction resistance (Rct) of the negative electrode was determined to obtain the initial resistance.

Second to Eleventh Embodiments and First and Second Comparative Embodiments

The same procedure as in First Embodiment was carried out except that the crosslinked polymer salts used were as indicated in Table 3, thereby obtaining negative electrode plates and batteries. The obtained negative electrode plates and batteries were subjected to the same evaluations as in First Embodiment. The results are indicated in Table 3.

TABLE 3

| | | | | 1st Embodiment | 2nd Embodiment | 3rd Embodiment | 4th Embodiment | 5th Embodiment | 6th Embodiment |
|---|---|---|---|---|---|---|---|---|---|
| Mixture layer slurry composition | Binder | Crosslinked polymer salt | Type | P-1 | P-2 | P-3 | P-4 | P-5 | P-6 |
| | | | [parts] | 1.5 | 1.5 | 1.5 | 1.5 | 1.5 | 1.5 |
| | | SBR | [parts] | 1.5 | 1.5 | 1.5 | 1.5 | 1.5 | 1.5 |
| | | CMC | [parts] | 1.5 | 1.5 | 1.5 | 1.5 | 1.5 | 1.5 |
| Slurry property | Applicability | | [—] | B | A | A | A | A | A |
| Electrode plate property | Adhesiveness | | [mN/25 mm] | 760 | 705 | 750 | 760 | 745 | 755 |
| Battery properties | Initial resistance (0° C.) | | [mΩ] | 18 | 16 | 16 | 17 | 17 | 25 |
| | 100-cycle capacity maintenance rate | | [%] | 92 | 80 | 90 | 86 | 60 | 91 |

| | | | | 7th Embodiment | 8th Embodiment | 9th Embodiment | 10th Embodiment | 11th Embodiment |
|---|---|---|---|---|---|---|---|---|
| Mixture layer slurry composition | Binder | Crosslinked polymer salt | Type | P-7 | P-8 | P-9 | P-10 | P-11 |
| | | | [parts] | 1.5 | 1.5 | 1.5 | 1.5 | 1.5 |
| | | SBR | [parts] | 1.5 | 1.5 | 1.5 | 1.5 | 1.5 |
| | | CMC | [parts] | 1.5 | 1.5 | 1.5 | 1.5 | 1.5 |
| Slurry property | Applicability | | [—] | B | B | A | A | A |
| Electrode plate property | Adhesiveness | | [mN/25 mm] | 810 | 780 | 740 | 730 | 745 |
| Battery properties | Initial resistance (0° C.) | | [mΩ] | 18 | 18 | 16 | 16 | 17 |
| | 100-cycle capacity maintenance rate | | [%] | 93 | 92 | 90 | 89 | 91 |

| | | | | 1st Comparative Embodiment | 2nd Comparative Embodiment |
|---|---|---|---|---|---|
| Mixture layer slurry composition | Binder | Crosslinked polymer salt | Type | P-12 | P-13 |
| | | | [parts] | 1.5 | 1.5 |
| | | SBR | [parts] | 1.5 | 15 |
| | | CMC | [parts] | 1.5 | 1.5 |
| Slurry property | Applicability | | [—] | A | A |
| Electrode plate property | Adhesiveness | | [mN/25 mm] | 620 | 650 |
| Battery properties | Initial resistance (0° C.) | | [mΩ] | 16 | 17 |
| | 100-cycle capacity maintenance rate | | [%] | 70 | 72 |

As indicated in Table 3, First to Eleventh Embodiments containing binders which are crosslinked polymers made from macromonomers all showed preferable adhesiveness and battery property while securing applicability. It was also found that when the macromonomer contains IBMA at a high proportion, adhesiveness and cycle property may be easily improved (First, Second and Eighth Embodiments), when the monomer components contain PEA (phenylethyl acrylate), adhesiveness and cycle property may be easily improved (Seventh Embodiment) and when the pH is 8.0 or more, high cycle property may be easily obtained (Third to Fifth Embodiments). It was also found that a lithium salt provides better initial resistance than a sodium salt (Third Embodiment and Sixth Embodiment). Further, a macromonomer having a polymerizable functional group in the intermediate segment of the molecular chain may easily have improved adhesiveness and cycle property compared to a macromonomer having a polymerizable functional group at an end (First to Ninth Embodiments and Tenth and Eleventh Embodiments).

Meanwhile, it was found that when a crosslinked polymer which did not contain a macromonomer was used, it was difficult to improve adhesiveness and even when a crosslinked polymer having a hydrophobic alkyl group in the molecular chain was used, it was difficult to improve adhesiveness (First and Second Comparative Embodiments).

From the above results, it was found that when the crosslinked polymer containing a macromonomer having a hydrophobic alkyl group was used, binding ability to an electrode material was improved and a mixture layer and electrode with preferable integrity could be formed.

INDUSTRIAL APPLICABILITY

The binder for a non-aqueous electrolyte secondary battery electrode of the present application is expected to be applied to various secondary batteries such as secondary batteries for automobiles.

The invention claimed is:

1. A binder for a non-aqueous electrolyte secondary battery electrode, comprising:
a crosslinked polymer having a carboxyl group or a salt thereof, wherein
the crosslinked polymer includes
a structural unit derived from an ethylenically unsaturated carboxylic acid monomer; and
a structural unit derived from a macromonomer having a linear structure of a straight chain and including at least one monomer selected from compounds represented by following formula (1):

[C1]

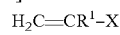  formula (1)

wherein in formula (1), $R^1$ represents a methyl group; X represents $C(=O)OR^2$; and $R^2$ represents a straight chain or branched C1-C8 alkyl group or a C3-C8 alkyl group having an alicyclic structure,
wherein the macromonomer has 70 mass % or more of the monomer selected from compounds represented by the formula (1) and an ethylenically unsaturated group in the end or the intermediate segment of the molecular chain of the macromonomer and
wherein, the crosslinked polymer comprises 50% by mass or more and 99.5% by mass or less of the structural unit derived from the ethylenically unsaturated carboxylic acid monomer relative to the all structural units in the crosslinked polymer and 0.1% by mass or more and 50% by mass or less of the structural unit derived from the macromonomer relative to the all structural units in the crosslinked polymer.

2. The binder according to claim 1, wherein the crosslinked polymer further includes a structural unit derived from a crosslinkable monomer.

3. The binder according to claim 1, wherein the salt of the crosslinked polymer comprises a lithium salt.

4. The binder according to claim 1, wherein the crosslinked polymer or a salt thereof has a pH of 8.0 or more in a 0.5% by mass aqueous solution.

5. The binder according to claim 1, wherein the crosslinked polymer comprises 80% by mass or more and 99.9% by mass or less of the structural unit derived from the first ethylenically unsaturated carboxylic acid monomer relative to all structural units in the crosslinked polymer and 0.1% by mass or more and 20% by mass or less of the structural unit derived from the macromonomer relative to all structural units of the crosslinked polymer.

6. The binder according to claim 1, wherein the crosslinked polymer comprises 98% by mass or more of the structural unit derived from the first ethylenically unsaturated carboxylic acid monomer relative to all structural units in the crosslinked polymer.

7. The binder according to claim 1, wherein the ethylenically unsaturated carboxylic acid monomer is acrylic acid.

8. The binder according to claim 1, wherein the macromonomer has the ethylenically unsaturated group in the end of the molecular chain of the macromonomer.

9. The binder according to claim 1, wherein the macromonomer has methacryloyl group as the ethylenically unsaturated group.

10. The binder according to claim 1, wherein the macromonomer has a number average molecular weight (Mn) of 2,000 to 10,000.

* * * * *